(12) United States Patent
Zhang

(10) Patent No.: US 12,008,347 B2
(45) Date of Patent: Jun. 11, 2024

(54) MATCHING GRAPHS GENERATED FROM SOURCE CODE

(71) Applicant: Google LLC, Mountain View, CA (US)

(72) Inventor: Qianyu Zhang, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/940,831

(22) Filed: Sep. 8, 2022

(65) Prior Publication Data

US 2023/0004364 A1   Jan. 5, 2023

Related U.S. Application Data

(63) Continuation of application No. 17/009,306, filed on Sep. 1, 2020, now Pat. No. 11,455,152.

(51) Int. Cl.
*G06F 8/41*   (2018.01)
*G06N 3/02*   (2006.01)
*G06N 20/00*   (2019.01)

(52) U.S. Cl.
CPC .............. *G06F 8/427* (2013.01); *G06F 8/433* (2013.01); *G06N 3/02* (2013.01); *G06N 20/00* (2019.01)

(58) Field of Classification Search
CPC ........... G06F 8/427; G06F 8/433; G06N 3/02; G06N 20/00
USPC .................................................. 717/124–167
See application file for complete search history.

(56) References Cited

U.S. PATENT DOCUMENTS

| | | | | |
|---|---|---|---|---|
| 8,296,744 | B2* | 10/2012 | Langworthy | G06F 8/43 717/142 |
| 9,223,554 | B1* | 12/2015 | Lawson | G06F 9/44521 |
| 10,303,448 | B2* | 5/2019 | Steven | G06F 8/33 |
| 10,866,885 | B2 | 12/2020 | Anandh et al. | |
| 10,871,950 | B2 | 12/2020 | De Smet | |

(Continued)

OTHER PUBLICATIONS

Christophides, Vassilis, et al. "End-to-end entity resolution for big data: A survey." arXiv preprint arXiv:1905.06397 (2019). pp. 1-37 ( Year: 2019).*

(Continued)

*Primary Examiner* — Satish Rampuria
(74) *Attorney, Agent, or Firm* — Gray Ice Higdon

(57) ABSTRACT

Techniques are described herein for training a machine learning model and using the trained machine learning model to more accurately determine alignments between matching/corresponding nodes of predecessor and successor graphs representing predecessor and successor source code snippets. A method includes: obtaining a first abstract syntax tree that represents a predecessor source code snippet and a second abstract syntax tree that represents a successor source code snippet; determining a mapping across the first and second abstract syntax trees; obtaining a first control-flow graph that represents the predecessor source code snippet and a second control-flow graph that represents the successor source code snippet; aligning blocks in the first control-flow graph with blocks in the second control-flow graph; and applying the aligned blocks as inputs across a trained machine learning model to generate an alignment of nodes in the first abstract syntax tree with nodes in the second abstract syntax tree.

15 Claims, 6 Drawing Sheets

(56) References Cited

U.S. PATENT DOCUMENTS

| | | | |
|---|---|---|---|
| 10,983,761 B2* | 4/2021 | Svyatkovskiy | G06F 8/33 |
| 2010/0050151 A1* | 2/2010 | Balasubramanian | G06F 8/33 |
| | | | 717/105 |
| 2012/0185422 A1 | 7/2012 | Shah et al. | |
| 2018/0373986 A1* | 12/2018 | Rainwater | G06F 11/36 |
| 2019/0303141 A1* | 10/2019 | Li | G06F 16/9024 |
| 2020/0120109 A1 | 4/2020 | Shu et al. | |
| 2020/0210158 A1 | 7/2020 | Bucuvalas et al. | |
| 2020/0218859 A1* | 7/2020 | Galitsky | G06F 40/35 |
| 2020/0334495 A1 | 10/2020 | Al-Rfou et al. | |
| 2021/0097044 A1* | 4/2021 | Idreos | G06F 16/21 |
| 2021/0271965 A1 | 9/2021 | Malynin et al. | |
| 2022/0019410 A1* | 1/2022 | Cangea | G06F 8/33 |
| 2022/0066752 A1 | 3/2022 | Zhang | |

OTHER PUBLICATIONS

Lopez, Adam. "Statistical machine translation." ACM Computing Surveys (CSUR) 40.3 (2008): pp. 1-49. (Year: 2008).*

Katz, Omer, et al. "Towards neural decompilation." arXiv preprint arXiv:1905.08325 (2019).pp.1-18 (Year: 2019).*

Li, Zhifeng, et al. "Aging face recognition: a hierarchical learning model based on local patterns selection." IEEE Transactions on Image Processing 25.5 (2016): pp. 2146-2154. (Year: 2016).*

Liu, Junfeng, et al. "MATA: Combining Learnable Node Matching with A Algorithm for Approximate Graph Edit Distance Computation." Proceedings of the 32nd ACM International Conference on Information and Knowledge Management. 2023.pp. 10501-10519 (Year: 2023).*

Bart, Evgeniy, and Shimon Ullman. "Class-based feature matching across unrestricted transformations." IEEE transactions on pattern analysis and machine intelligence 30.9 (2008): pp. 1618-1631. (Year: 2008).*

Striewe et al.; A review of static analysis approaches for programming exercises; International Computer Assisted Assessment Conference; Springer; pp. 100-113; dated 2014.

Baxter, et al.; Clone detection using abstract syntax tress; Proceedings—International Conference of Software Maintenance; IEEE; pp. 1-11; dated 1998.

Kikuchi et al.; A source code plagiarism detecting method using alignment with abstract syntax tree elements; 15th IEEE/ACIS International Conference on Software Engineering; Artificial Intelligence; Networking and Parallel/Distributed Computing; pp. 1-6; dated 2014.

Stelzer, T. et al.; Automatic generation of tree level helicity amplitudes; Computer Physics Communications 81.3; pp. 357-371; dated 1994.

Ottenstein, K. J. et al.; The program dependence graph in a software development environment; ACM Sigplan Notices 19.5; pp. 177-184; dated 1984.

Ferrante, J. et al.; The program dependence graph and its use in optimization; ACM Transactions on Programming Languages and Systems (TOPLAS) 9.3; pp. 319-349; dated 1987.

Chan, P. et al.; A method to evaluate CFG comparison algorithms; 14th International Converence on Quality Software IEEE; 10 pages; dated 2014.

Deng, J. et al.; A Suitable AST Node Granularity and Multi-Kernel Transfer Convolutional Neural Network for Cross-Project Defect Prediction; IEEE Access; 15 pages; dated 2020.

Mou, L. et al.; Building program vector representations for deep learning; Software Institute; 11 pages; dated 2014.

Phan, A. et al.; Convolutional Neural Networks over Control Flow Graphs for Software Defect Prediction; Japan Advanced Institute of Information Technology; 8 pages; dated 2018.

Wang, W. et al.; Detecting Code Clones with Graph Neural Network and Flow-Augmented Abstract Syntax Tree; IEEE; 11 pages; dated 2020.

Jiang, B. et al.; GLMNet Graph Learning-Matching Networks for Feature Matching; Computer Science and Technology; 8 pages; dated 2019.

Li, Y. et al.; Graph Matching Networks for Learning the Similarity of Graph Structured Objects; 18 pages; dated May 2019.

Ling, X. et al.; Hierarchical graph matching networks for deep graph similarity learning; ICLR; 18 pages; dated 2020.

* cited by examiner

MATCHING GRAPHS GENERATED FROM SOURCE CODE

BACKGROUND

One way to identify changes made to a piece or "snippet" of source code is to generate graphs that represent the source code snippet before and after editing. These graphs may represent what will be referred to herein as "predecessor" and "successor" source code snippets. The predecessor source code snippet may be the source code snippet of interest prior to some changes being made to it, and may be represented by a first graph. The successor source code snippet may be the same source code snippet after the changes have been made, and may be represented by a second graph. In some cases, a change graph may be determined from the first and second graphs, and may represent the changes made to the source code snippet. Each graph may take various forms, such as an abstract syntax tree (AST), a control flow graph (CFG), etc. Heuristics exist to map matching nodes of the (predecessor) first graph to nodes of the second (successor) graph. However, these heuristics tend to be somewhat inaccurate, which in turn can cause downstream operations that rely on the mappings to be inaccurate as well.

SUMMARY

Implementations are described herein for generating an alignment of nodes in a first graph representing a predecessor source code snippet and a second graph representing a successor source code snippet. In various implementations, a machine learning model such as a graph neural network may be trained to generate an alignment of nodes across abstract syntax trees using, as inputs, aligned blocks in control-flow graphs representing the predecessor and successor source code snippets. This alignment may be used for purposes such as generating a change graph that represents one or more edits made to the predecessor source code snippet to yield the successor source code snippet.

In some implementations, the first control-flow graph and the second control-flow graph may be obtained using a parser to generate the first control-flow graph from the predecessor source code snippet and the second control-flow graph from the successor source code snippet, and the blocks in control-flow graphs may be aligned based on a mapping across the first abstract syntax tree and the second abstract syntax tree. The mapping may be generated using a tree-based code differencing algorithm.

In another aspect, a synthetic training dataset may be generated using a first abstract syntax tree that represents a source code snippet. In various implementations, a second abstract syntax tree may be generated from the first abstract syntax tree. In some implementations, field values in various nodes in the second abstract syntax tree may be changed. One or more nodes may be deleted in the first abstract syntax tree and/or the second abstract syntax tree. Additionally, a parent node may be changed for one or more nodes in the second abstract syntax tree. In various implementations, a machine learning model may be trained to generate an alignment of nodes based on the first abstract syntax tree and the second abstract syntax tree.

In various implementations, a method implemented by one or more processors may include: obtaining a first abstract syntax tree that represents a predecessor source code snippet and a second abstract syntax tree that represents a successor source code snippet; determining a mapping across the first abstract syntax tree and the second abstract syntax tree between pairs of matching nodes; obtaining a first control-flow graph that represents the predecessor source code snippet and a second control-flow graph that represents the successor source code snippet; aligning blocks in the first control-flow graph with blocks in the second control-flow graph based on the mapping across the first abstract syntax tree and the second abstract syntax tree; and applying the aligned blocks as inputs across a trained machine learning model to generate an alignment of nodes in the first abstract syntax tree with nodes in the second abstract syntax tree.

In some implementations, the trained machine learning model may include a graph neural network. In some implementations, the determining the mapping across the first abstract syntax tree and the second abstract syntax tree may include using a tree-based code differencing algorithm. In some implementations, the obtaining the first control-flow graph and the second control-flow graph may include using a parser to generate the first control-flow graph from the predecessor source code snippet and the second control-flow graph from the successor source code snippet.

In some implementations, the aligning the blocks in the first control-flow graph with the blocks in the second control-flow graph based on the mapping across the first abstract syntax tree and the second abstract syntax tree may include: determining a mapping across the first control-flow graph and the second control-flow graph between pairs of similar blocks identified using the mapping across the first abstract syntax tree and the second abstract syntax tree; and using the mapping across the first control-flow graph and the second control-flow graph to align the blocks in the first control-flow graph with the blocks in the second control-flow graph.

In some implementations, in the applying the aligned blocks as inputs across the trained machine learning model to generate the alignment of nodes in the first abstract syntax tree with nodes in the second abstract syntax tree, candidate node alignments may be constrained based on nodes in the aligned blocks.

In some implementations, a change graph may be generated based on the alignment of the nodes in the first abstract syntax tree with the nodes in the second abstract syntax tree. The change graph may represent one or more edits made to the predecessor source code snippet to yield the successor source code snippet.

In some additional or alternative implementations, a computer program product may include one or more non-transitory computer-readable storage media having program instructions collectively stored on the one or more non-transitory computer-readable storage media. The program instructions may be executable to: obtain a first abstract syntax tree that represents a predecessor source code snippet and a second abstract syntax tree that represents a successor source code snippet; determine a mapping across the first abstract syntax tree and the second abstract syntax tree between pairs of matching nodes; obtain a first control-flow graph that represents the predecessor source code snippet and a second control-flow graph that represents the successor source code snippet; align blocks in the first control-flow graph with blocks in the second control-flow graph based on the mapping across the first abstract syntax tree and the second abstract syntax tree; and apply the aligned blocks as inputs across a trained machine learning model to generate an alignment of nodes in the first abstract syntax tree with nodes in the second abstract syntax tree.

In some implementations, the program instructions may be further executable to generate a change graph based on the alignment of the nodes in the first abstract syntax tree with the nodes in the second abstract syntax tree. The change graph may represent one or more edits made to the predecessor source code snippet to yield the successor source code snippet.

In some additional or alternative implementations, a system may include a processor, a computer-readable memory, one or more computer-readable storage media, and program instructions collectively stored on the one or more computer-readable storage media. The program instructions may be executable to: obtain a first abstract syntax tree that represents a predecessor source code snippet and a second abstract syntax tree that represents a successor source code snippet; determine a mapping across the first abstract syntax tree and the second abstract syntax tree between pairs of matching nodes; obtain a first control-flow graph that represents the predecessor source code snippet and a second control-flow graph that represents the successor source code snippet; align blocks in the first control-flow graph with blocks in the second control-flow graph based on the mapping across the first abstract syntax tree and the second abstract syntax tree; and apply the aligned blocks as inputs across a trained machine learning model to generate an alignment of nodes in the first abstract syntax tree with nodes in the second abstract syntax tree.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
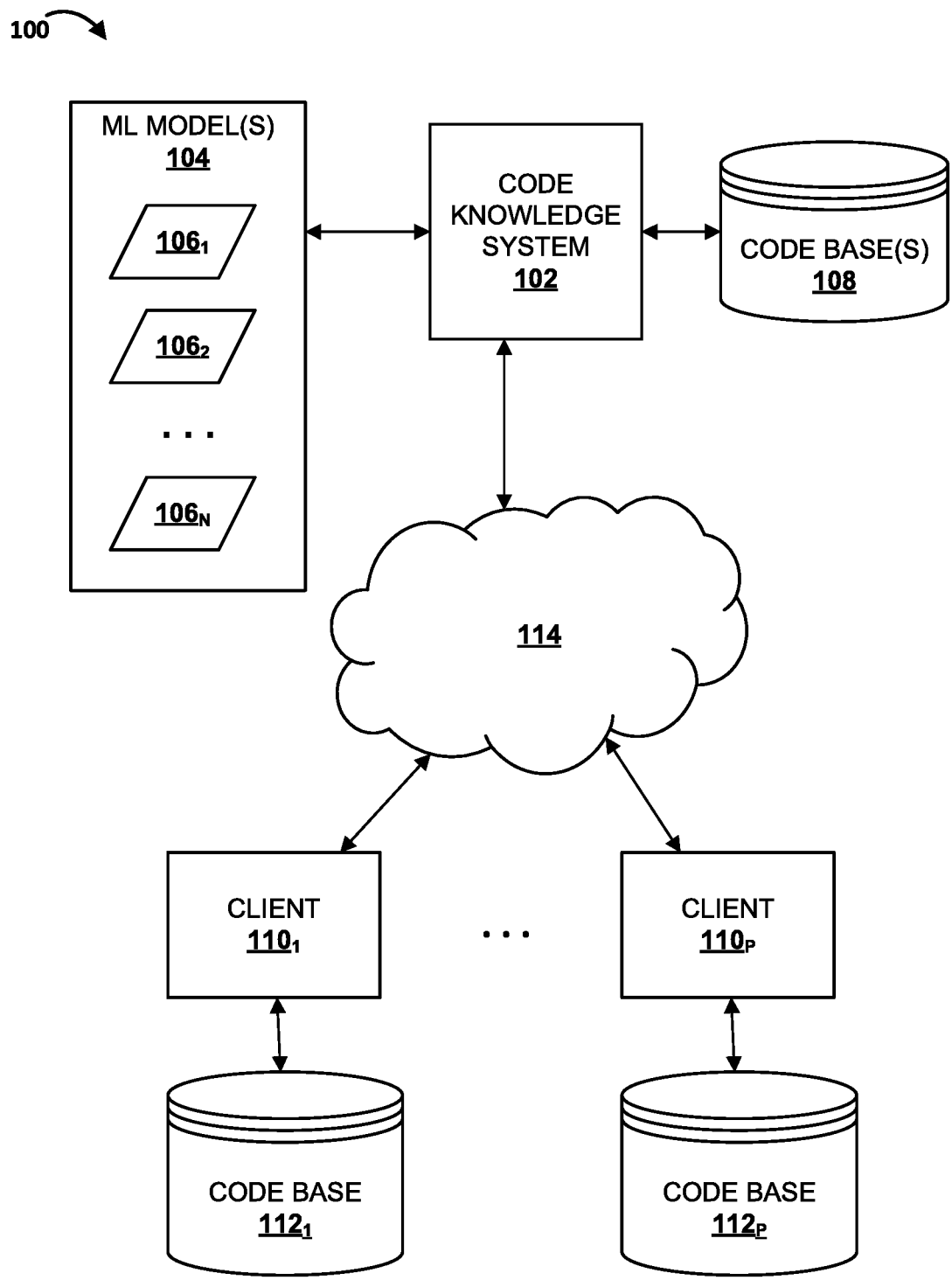
FIG. 1 depicts an example environment in which selected aspects of the present disclosure may be implemented, in accordance with various implementations.

FIG. 1 depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

Code knowledge system 102 may be configured to perform selected aspects of the present disclosure in order to help one or more clients $110_{1-P}$ make various inferences based on implemented and/or potential changes to the clients' respective source code bases $112_{1-P}$. For example, code knowledge system 102 may be configured to determine alignments of nodes between graphs representing predecessor source code snippets and graphs representing successor source code snippets associated with source code bases $112_{1-P}$ of clients $110_{1-P}$.

These alignments may then be used for a variety of different purposes, such as to generate a change graph for use as input to other downstream source code predictions, such as to predict code change intents (e.g., change log entries), comments to be embedded into source code, identification of coding mistakes, etc. These change graphs can also be used in other contexts to train other types of machine learning models. For example, a machine learning model such as a graph neural network (GNN) may be trained using change graphs generated as described herein to predict code changes, e.g., during a large-scale source code update and/or migration.

Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth.

Many of these entities' code bases 112 may be highly complex, requiring teams of programmers and/or software engineers to perform code base migrations, maintenance, and/or updates. Many of these personnel may be under considerable pressure, and may place low priority on tasks that might be considered "menial" or expendable, such as composing descriptive and/or helpful code change intents, in embedded comments or as part of change list entries. Moreover, a mass code update or migration may require myriad small changes to source code at numerous locations, further challenging these personnel.

Accordingly, code knowledge system 102 may be configured to leverage knowledge of past changes made to source code, such as during code base migration, update, or maintenance events, in order to automate tasks such as composition and/or summarization of code change intents and/or comments, to predict code changes, etc. Many of these tasks may rely on the ability to accurately and quickly identify changes made to source code. Although it is possible to perform text comparisons to determine textual changes between different versions of source code, these textual changes may not convey structure relationships embodied in the source code, e.g., between different logical branches, statements, variables, etc.

Source code—and changes to source code—can also be represented in graph form. For example, source code may be converted into an abstract syntax tree (AST) and/or control flow graph (CFG), either of which may maintain not only the syntax of the code, but also the underlying structure. A change graph can be generated based on graphs representing a source code snippet before (predecessor) and after (successor) the source code snippet is changed.

Conventional heuristics for determining an alignment between matching/corresponding nodes of the predecessor and successor graphs in order to generate a change graph may have limited accuracy. Many of the code changes may be minor, may be relatively hard to discern in similar contexts, and/or may be incomplete and/or semantically incorrect. Accordingly, code knowledge system 102 is configured with selected aspects of the present disclosure to leverage machine learning to more accurately determine alignments between matching/corresponding nodes of predecessor and successor graphs representing predecessor and successor source code snippets.

As noted above, alignments between matching nodes in general, and change graphs generated therefrom in particular, may have a variety of uses. As one example, with change graphs generated using techniques described herein, a machine learning model such as a GNN may be trained to predict code changes, e.g., to automate at least part of a widespread source code update and/or migration. As another example, change graphs generated using techniques described herein may be processed using a machine learning model such as a GNN to automatically predict and/or compose code change intents. Code change intents may be embodied in various forms, such as in change list entries that are sometimes required when an updated source code snippet is committed (e.g., installed, stored, incorporated) into a code base, in comments (e.g., delimited with symbols such as "//" or "#") embedded in the source code, in change logs, or anywhere else where human-composed language indicating an intent behind a source code change might be found.

In either case (predicting code changes or the intents behind them), labeled pairs of predecessor/successor source code snippets may be used to generate corresponding pairs of graphs (e.g., ASTs, CFGs). These graph pairs may be processed with a machine learning model such as a GNN to generate an embedding in vector space. Techniques such as triplet loss may then be used to train the machine learning model based on the embedding's relative proximity in the latent space to other embeddings having similar and dissimilar labels. Labels used for code change prediction and labels used for code change intent prediction may or may not be similar, identical, or entirely different from each other.

Subsequently, to predict a code change, a source code snippet to-be-updated may be converted into graph form and embedded into the vector space using the trained machine learning model. Various nearest neighbor search algorithms may then be used to identify proximate embeddings that represent previous code changes made during previous migrations. These previous code changes may be considered as candidate edits for the source code snippet to-be-updated. Similarly, to predict a code change intent, predecessor and successor source code snippets may be converted into graph form and embedded into the same vector space or a different vector space using the trained machine model. Various nearest neighbor search algorithms may then be used to identify proximate embeddings that represent previous code changes made during previous migrations, as well as code change intents behind those changes.

In various implementations, code knowledge system 102 may include a machine learning ("ML" in FIG. 1) database 104 that includes data indicative of one or more trained machine learning models $106_{1-N}$. These machine learning models $106_{1-N}$ may take various forms that will be described in more detail below, including but not limited to a GNN, a graph matching network (GMN), a sequence-to-sequence model such as various flavors of a recurrent neural network (e.g., long short-term memory, or "LSTM", gate recurrent units, or "GRU", etc.) or an encoder-decoder, and any other type of machine learning model that may be applied to facilitate selected aspects of the present disclosure. In some implementations, code knowledge system 102 may also have access to one or more code base(s) 108. In some implementations, the code bases 108 may be used, for instance, to train one or more of the machine learning models $106_{1-N}$.

In various implementations, a client 110 that wishes to take advantage of techniques described herein to, for example, predict and/or implement code changes and/or code change intents when migrating, updating, or even maintaining its code base 112 may establish a relationship with an entity (not depicted in FIG. 1) that hosts code knowledge system 102. In some implementations, code knowledge system 102 may then process all or parts of the client's source code base 112, e.g., by interfacing with the client's software development version control system (not depicted) over one or more networks 114 such as the Internet. Based on this processing, code knowledge system 102 may perform various techniques described herein for predicting and/or utilizing code changes and/or the intents behind them. In other implementations, e.g., where the client's code base 112 is massive, one or more representatives of the entity that hosts code knowledge system 102 may travel to the client's site(s) to perform updates and/or make recommendations.

Figure 2:
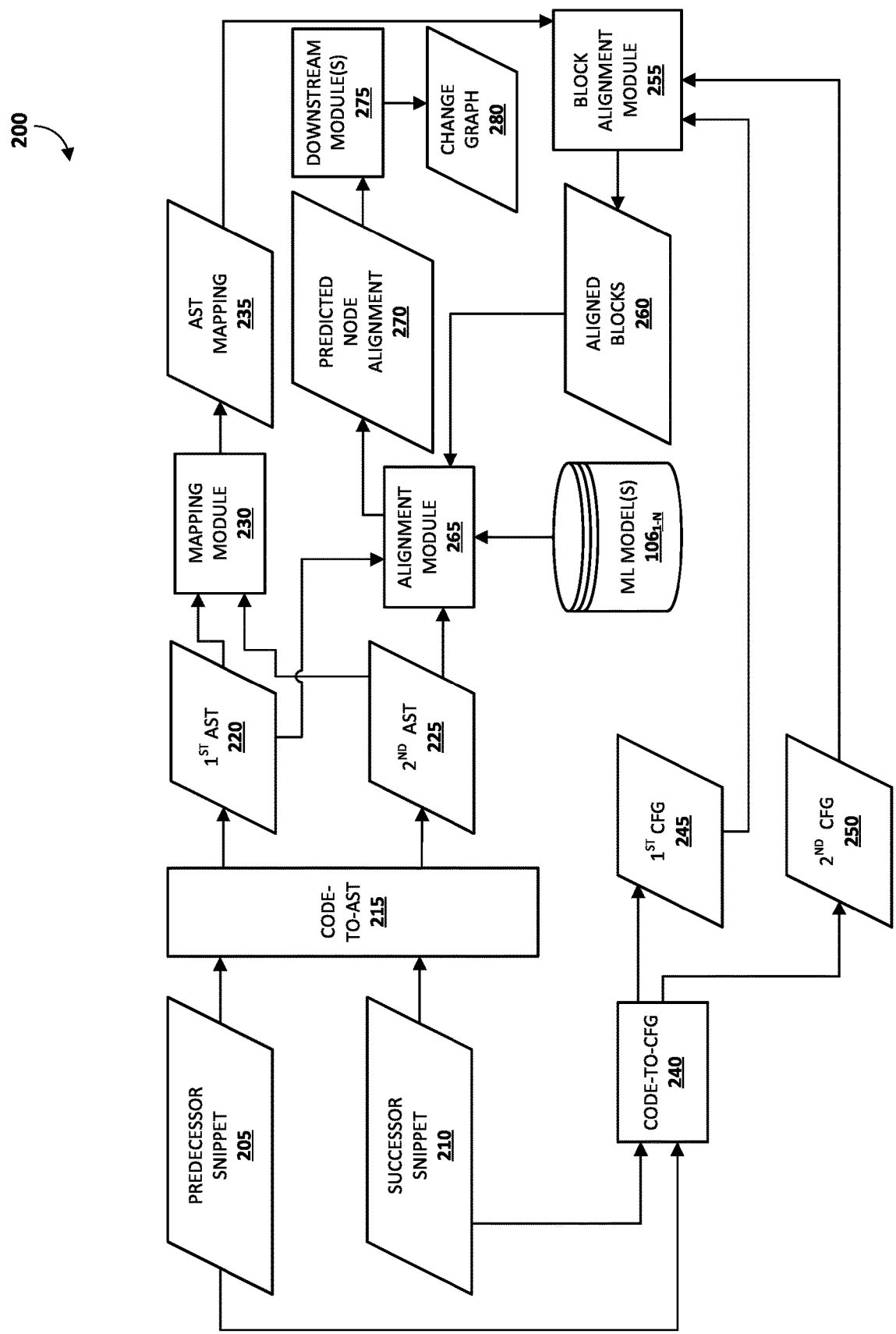
FIG. 2 is a block diagram showing an example of how one or more machine learning models trained using techniques described herein may be used to make inferences, in accordance with various implementations.

FIG. 2 is a block diagram showing an example process flow 200 in which code knowledge system 102 may use one or more machine learning models $106_{1-N}$ trained using techniques described herein to make inferences, in accordance with various implementations. Various components depicted in FIG. 2 may be implemented by code knowledge system 102 or separately from code knowledge system 102. These components may be implemented using any combination of hardware and computer-readable instructions.

Beginning at the top left, in implementations, a predecessor source code snippet 205 and a successor source code snippet 210 may be processed by a "code-to-AST" component 215 to generate, respectively, first AST 220 and second AST 225. In other implementations, source code snippets 205, 210 may be converted into other types of graphs.

In implementations, the first AST 220 and the second AST 225 may be processed by a mapping module 230 to generate an AST mapping 235. The mapping module 230 may generate, as the AST mapping 235, a mapping across the first AST 220 and the second AST 225 using, e.g., a tree-based code differencing algorithm. In implementations, the AST mapping 235 may be a mapping between pairs of similar nodes in the first AST 220 and the second AST 225.

In implementations, the predecessor source code snippet 205 and the successor source code snippet 210 may also be processed by a "code-to-CFG" component 240 to generate, respectively, first CFG 245 and second CFG 250. In implementations, the code-to-CFG component 240 may use a parser to generate the first CFG 245 from the predecessor source code snippet 205 and the second CFG 250 from the successor source code snippet 210.

In implementations, the first CFG 245 and the second CFG 250 may be processed by a block alignment module 255 to generate aligned blocks 260. The block alignment module 255 may align blocks in the first CFG 245 with blocks in the second CFG 250 based on the AST mapping 235. In implementations, the block alignment module 255 may determine a mapping across the first CFG 245 and the second CFG 250 between pairs of similar blocks identified using the AST mapping 235 across the first AST 220 and the second AST 225. The block alignment module 255 may then use the mapping across the first CFG 245 and the second CFG 250 to generate aligned blocks 260 in which the blocks in the first CFG 245 are aligned with the blocks in the second CFG 250.

In implementations, the first AST 220, the second AST 225, and the aligned blocks 260 may be applied by an alignment module 265 as inputs across a machine learning model $106_{1-N}$ (e.g., a GNN) to generate a predicted node alignment 270 between the first AST 220 and the second AST 225. In implementations, the alignment module 265 may constrain candidate node alignments based on nodes in the aligned blocks 260. In this manner, the predicted node alignment 270 may be generated in a hierarchical manner, block by block. For example, the alignment module 265 may use the machine learning model $106_{1-N}$ to generate a plurality of node similarity measures between individual nodes of the first AST 220 and nodes of the second AST 225 that are within aligned blocks and then generate the predicted node alignment 270 based on the node similarity measures. This may be true where, for instance, the machine learning model $106_{1-N}$ is a GNN. With a GNN, each node similarity measure of the plurality of node similarity measures may be based on a cross-graph attention mechanism (e.g., an attention layer) employed by the GNN. The cross-graph attention mechanism (e.g., attention layer) may provide an attention weight (also referred to as an "attention coefficient") for each possible pair of nodes that includes a node from the first AST 220 and a node from the second AST 225. Thus, in some implementations, the machine learning model $106_{1-N}$ takes the form of a cross-graph attention mechanism employed as part of a GNN.

The predicted node alignment 270 may be provided to various downstream module(s) 275 for additional processing. For example, one downstream module 275 may generate a change graph 280. As mentioned previously, change graph 280 may be used for a variety of purposes. For example, a prediction module (not shown) may be configured to process the change graph 280, e.g., using a machine learning model $106_{1-N}$ such as a GNN to make a prediction (not shown). These predictions may include, for instance, predicted code changes, predicted code change intents, etc.

Figure 3:
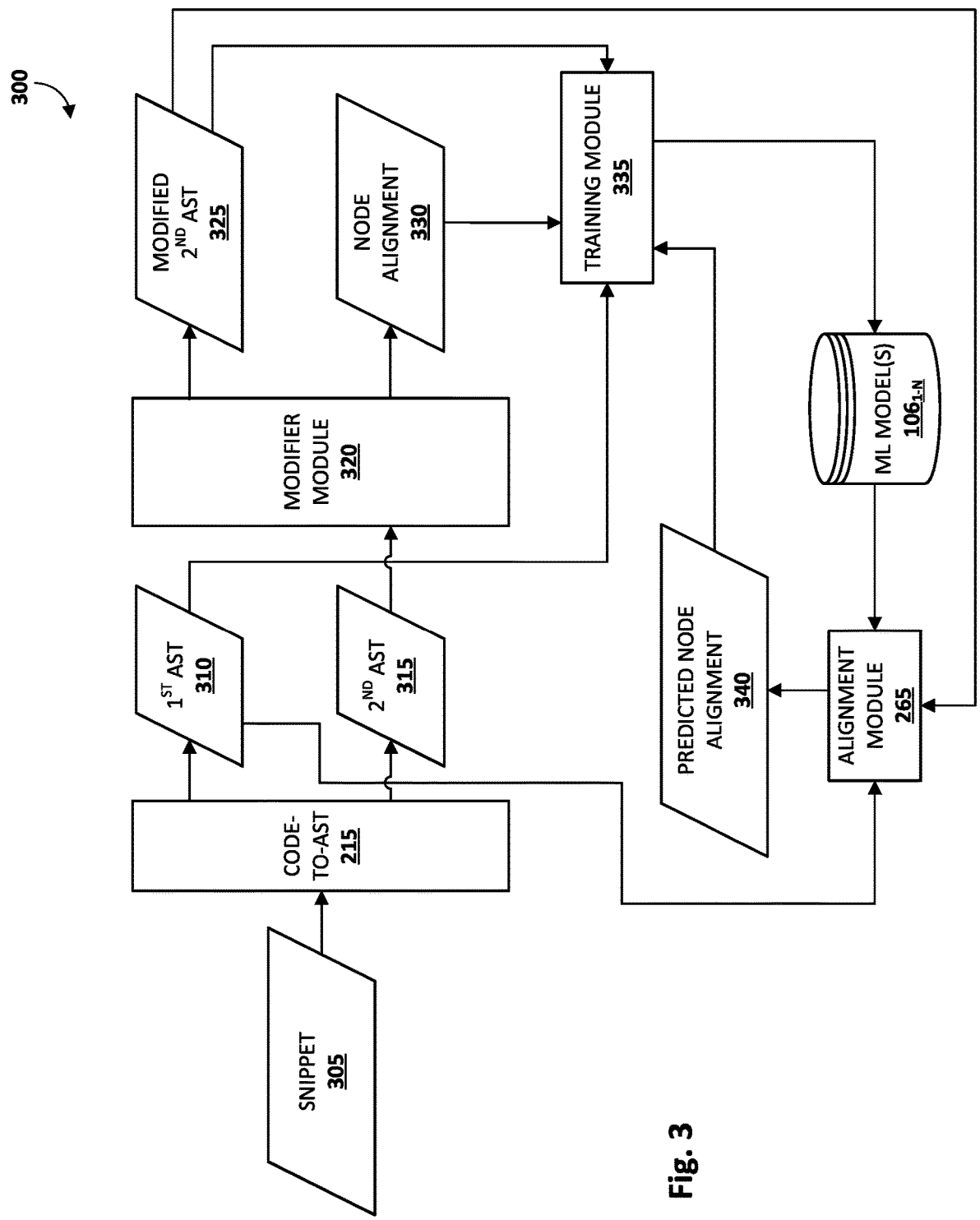
FIG. 3 is a block diagram showing an example of how a synthetic training dataset may be generated and used to train one or more machine learning models to make inferences, in accordance with various implementations.

FIG. 3 is a block diagram showing an example process flow 300 in which code knowledge system 102 may generate a synthetic training dataset and use the synthetic training dataset to train one or more machine learning models $106_{1-N}$ to make inferences, in accordance with various implementations. Various components depicted in FIG. 3 may be implemented by code knowledge system 102 or separately from code knowledge system 102. These components may be implemented using any combination of hardware and computer-readable instructions.

Beginning at the top left, in implementations, a source code snippet 305 may be processed by a "code-to-AST" component 215 to generate first AST 310. In implementations, the code-to-AST component 215 may also generate second AST 315, e.g., from the first AST 310. The second AST 315 may be a copy of the first AST 310. In other implementations, source code snippet 305 may be converted into other types of graphs.

In implementations, the second AST 315 may be processed by a modifier module 320 to generate, as a synthetic training dataset in conjunction with the first AST 310, a modified second AST 325 and a node alignment 330. The modifier module 320 may generate the modified second AST 325 by changing a field value of each node of a first set of nodes in the second AST 315, deleting each node in a second set of nodes in the second AST 315, and/or changing a parent node of each node in a third set of nodes in the second AST 315. Additionally, in implementations, the modifier module 320 may delete at least one node in the first AST 315. The node alignment 330 generated by the modifier module 320 may indicate a mapping across the first AST 310 and the modified second AST 325 between pairs of similar nodes (e.g., based on the modifications made by the modifier module 320). In implementations, the first AST 310, the modified second AST 325, and the node alignment 330 may be provided to a training module 335, which will be described shortly.

In implementations, the first AST 310 and the modified second AST 325 may be applied by an alignment module 265 as inputs across a machine learning model $106_{1-N}$ (e.g., a GNN). Additionally, in implementations, aligned blocks (not shown), e.g., generated in the manner described with respect to the aligned blocks 260 of FIG. 2, may also be applied by the alignment module 265 as inputs across the machine learning model $106_{1-N}$. The alignment module 265 may then use the machine learning model $106_{1-N}$ to generate a predicted node alignment 340 between the first AST 310 and the modified second AST 325, e.g., as described with respect to FIG. 2.

In implementations, the predicted node alignment 340 may be provided to the training module 335. Training module 335 may then perform a comparison of the predicted node alignment 340 and the node alignment 330 (e.g., a ground truth node alignment) and may train the machine learning model $106_{1-N}$ based on the comparison.

Figure 4:
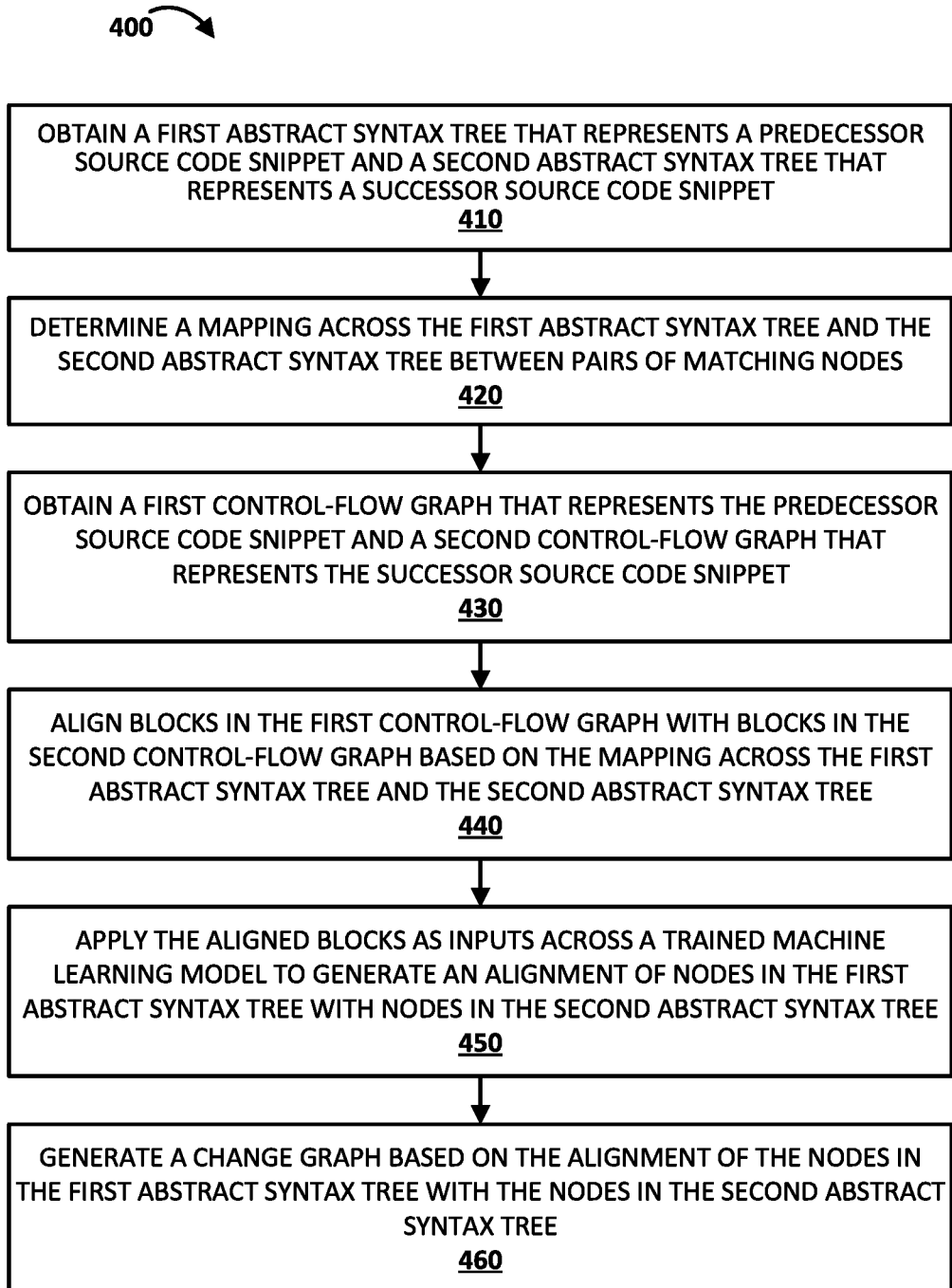
FIG. 4 depicts a flowchart illustrating an example method for using one or more machine learning models trained using techniques described herein to make inferences, in accordance with various implementations.

FIG. 4 is a flowchart illustrating an example method 400 of using one or more machine learning models $106_{1-N}$ trained using techniques described herein to make inferences, in accordance with implementations disclosed herein. For convenience, the operations of the flowchart are described with reference to a system that performs the operations. This system may include various components of various computer systems, such as one or more components of the code knowledge system 102. Moreover, while operations of method 400 are shown in a particular order, this is not meant to be limiting. One or more operations may be reordered, omitted, or added.

At block 410, the system may obtain a first abstract syntax tree that represents a predecessor source code snippet and a second abstract syntax tree that represents a successor source code snippet. In implementations, at block 410, the code knowledge system 102 may obtain the first abstract syntax tree (e.g., 220) that represents the predecessor source code snippet (e.g., 205) and the second abstract syntax tree (e.g., 225) that represents the successor source code snippet (e.g., 210).

Still referring to FIG. 4, at block 420, the system may determine a mapping across the first abstract syntax tree and the second abstract syntax tree between pairs of matching nodes. In implementations, at block 420, the code knowledge system 102 may determine the mapping (e.g., 235) across the first abstract syntax tree and the second abstract syntax tree between pairs of matching nodes. In implementations, the code knowledge system 102 may use a tree-based code differencing algorithm to determine the mapping.

Still referring to FIG. 4, at block 430, the system may obtain a first control-flow graph that represents the predecessor source code snippet and a second control-flow graph that represents the successor source code snippet. In implementations, at block 430, the code knowledge system 102 may obtain the first control-flow graph (e.g., 245) that represents the predecessor source code snippet and the second control-flow graph (e.g., 250) that represents the successor source code snippet. In implementations, the code knowledge system 102 may use a parser to generate the first control-flow graph from the predecessor source code snippet and the second control-flow graph from the successor source code snippet.

Still referring to FIG. 4, at block 440, the system may align blocks in the first control-flow graph with blocks in the second control-flow graph based on the mapping across the first abstract syntax tree and the second abstract syntax tree. In implementations, at block 440, the code knowledge system 102 may align blocks in the first control-flow graph with blocks in the second control-flow graph based on the mapping across the first abstract syntax tree and the second abstract syntax tree to generate aligned blocks (e.g., 260). In implementations, the code knowledge system 102 may determine a mapping across the first control-flow graph and the second control-flow graph between pairs of similar blocks identified using the mapping across the first abstract syntax tree and the second abstract syntax tree and then use the mapping across the first control-flow graph and the second control-flow graph to align the blocks in the first control-flow graph with the blocks in the second control-flow graph.

Still referring to FIG. 4, at block 450, the system may apply the aligned blocks as inputs across a trained machine learning model to generate an alignment of nodes in the first abstract syntax tree with nodes in the second abstract syntax tree. In implementations, at block 450, the code knowledge system 102 may apply the aligned blocks as inputs across the trained machine learning model (e.g., $106_{1-N}$) to generate an alignment of nodes (e.g., 270) in the first abstract syntax tree with nodes in the second abstract syntax tree. In implementations, the machine learning model $106_{1-N}$ may be a GNN. In other implementations, the machine learning model $106_{1-N}$ may be a GMN or any other type of machine learning model. In implementations, the code knowledge system 102 may constrain candidate node alignments based on nodes in the aligned blocks.

Still referring to FIG. 4, at block 460, the system may generate a change graph based on the alignment of the nodes in the first abstract syntax tree with the nodes in the second abstract syntax tree. In implementations, at block 460, the code knowledge system 102 may generate the change graph (e.g., 280) based on the alignment of the nodes in the first abstract syntax tree with the nodes in the second abstract syntax tree. The change graph may represent one or more edits made to the predecessor source code snippet to yield the successor source code snippet.

Figure 5:
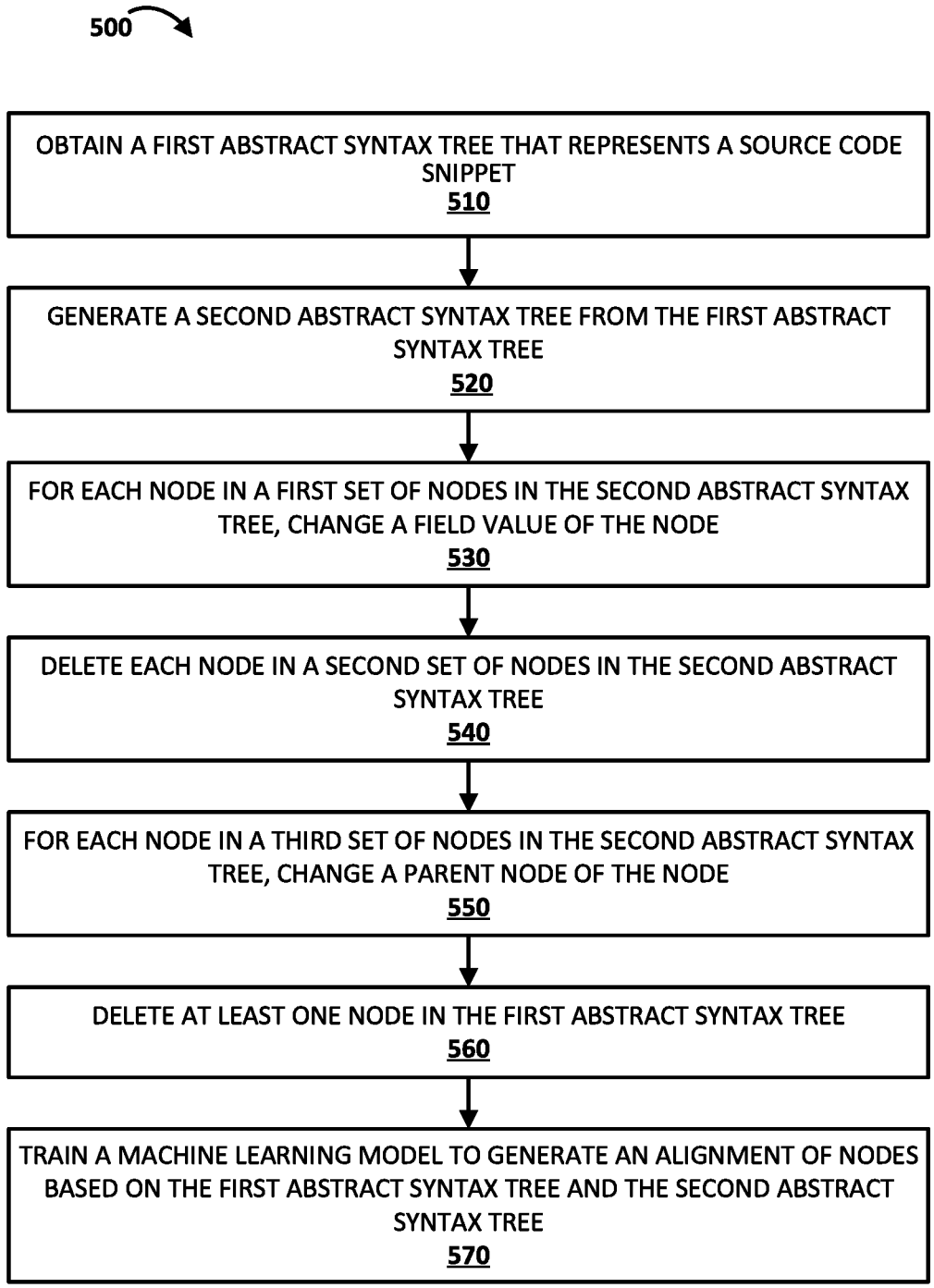
FIG. 5 depicts a flowchart illustrating an example method for generating a synthetic training dataset and using the synthetic training dataset to train one or more machine learning models, in accordance with various implementations.

FIG. 5 is a flowchart illustrating an example method 500 of generating a synthetic training dataset and using the synthetic training dataset to train one or more machine learning models $106_{1-N}$ to make inferences, in accordance with implementations disclosed herein. For convenience, the operations of the flowchart are described with reference to a system that performs the operations. This system may include various components of various computer systems, such as one or more components of the code knowledge system 102. Moreover, while operations of method 500 are shown in a particular order, this is not meant to be limiting. One or more operations may be reordered, omitted, or added.

At block 510, the system may obtain a first abstract syntax tree that represents a source code snippet. In implementations, at block 510, the code knowledge system 102 may obtain the first abstract syntax tree (e.g., 310) that represents a source code snippet (e.g., 305).

Still referring to FIG. 5, at block 520, the system may generate a second abstract syntax tree from the first abstract syntax tree. In implementations, at block 520, the code knowledge system 102 may generate the second abstract syntax tree (e.g., 315) from the first abstract syntax tree.

Still referring to FIG. 5, at block 530, for each node in a first set of nodes in the second abstract syntax tree, the system may change a field value of the node. In implementations, at block 530, the code knowledge system 102 may, for each node in the first set of nodes in the second abstract syntax tree, change a field value of the node to generate a modified second abstract syntax tree (e.g., 325).

Still referring to FIG. 5, at block 540, the system may delete each node in a second set of nodes in the second abstract syntax tree. In implementations, at block 540, the code knowledge system 102 may delete each node in the second set of nodes in the second abstract syntax tree to generate a modified second abstract syntax tree. In other implementations, at block 540, the code knowledge system 102 may delete each node in the second set of nodes in the modified second abstract syntax tree to further modify the modified second abstract syntax tree.

Still referring to FIG. 5, at block 550, for each node in a third set of nodes in the second abstract syntax tree, the system may change a parent node of the node. In implementations, at block 550, the code knowledge system 102 may, for each node in the third set of nodes in the second abstract syntax tree, change a parent node of the node to generate a modified second abstract syntax tree. In other implementations, at block 550, the code knowledge system 102 may, for each node in the third set of nodes in the modified second abstract syntax tree, change a parent node of the node to further modify the modified second abstract syntax tree.

Still referring to FIG. 5, at block 560, the system may delete at least one node in the first abstract syntax tree. In implementations, at block 560, the code knowledge system 102 may delete at least one node in the first abstract syntax tree.

Still referring to FIG. 5, at block 570, the system may train a machine learning model to generate an alignment of nodes based on the first abstract syntax tree and the second abstract syntax tree. In implementations, at block 570, the code knowledge system 102 may train a machine learning model (e.g., $106_{1-N}$) to generate an alignment of nodes (e.g., 340) based on the first abstract syntax tree and the modified second abstract syntax tree. In implementations, the machine learning model $106_{1-N}$ may be a GNN. In other implementations, the machine learning model $106_{1-N}$ may be a GMN or any other type of machine learning model.

Figure 6:
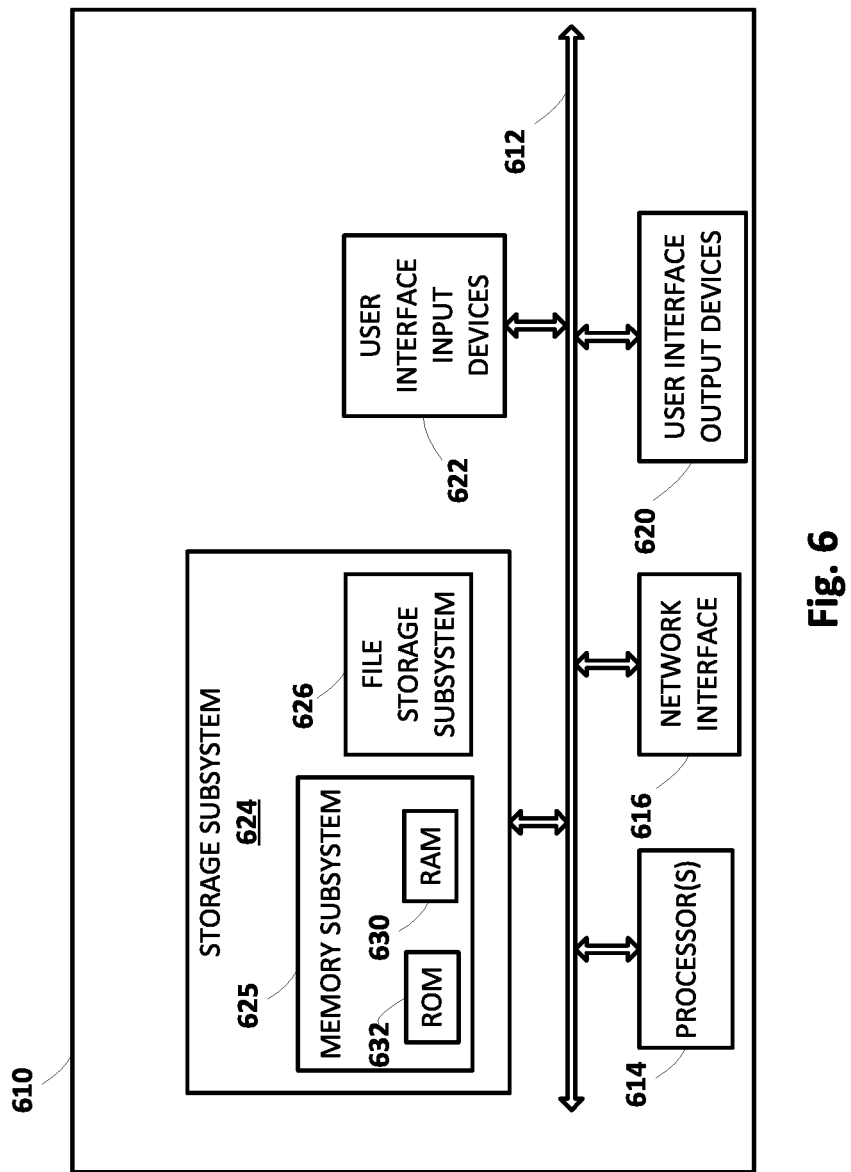
FIG. 6 illustrates an example architecture of a computing device.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the process flows of FIGS. 2 and 3 and the methods of FIGS. 4 and 5, as well as to implement various components depicted in FIG. 1.

These software modules are generally executed by processor 614 alone or in combination with other processors. The memory subsystem 625 included in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In other implementations, a method implemented by one or more processors may include: obtaining a first abstract syntax tree that represents a source code snippet; generating a second abstract syntax tree from the first abstract syntax tree; for each node in a first set of nodes in the second abstract syntax tree, changing a field value of the node; deleting each node in a second set of nodes in the second abstract syntax tree; and for each node in a third set of nodes in the second abstract syntax tree, changing a parent node of the node.

In some implementations, the method may further include deleting at least one node in the first abstract syntax tree. In some implementations, the method may further include training a machine learning model to generate an alignment of nodes based on the first abstract syntax tree and the second abstract syntax tree. In some implementations, the training the machine learning model may include: generating a predicted node alignment between the first abstract syntax tree and the second abstract syntax tree; comparing the predicted node alignment and a ground truth node alignment; and training the machine learning model based on the comparing.

In other implementations, a computer program product may include one or more non-transitory computer-readable storage media having program instructions collectively stored on the one or more non-transitory computer-readable storage media. The program instructions may be executable to: obtain a first abstract syntax tree that represents a source code snippet; generate a second abstract syntax tree from the first abstract syntax tree; for each node in a first set of nodes in the second abstract syntax tree, change a field value of the node; delete each node in a second set of nodes in the second abstract syntax tree; and for each node in a third set of nodes in the second abstract syntax tree, change a parent node of the node.

In some implementations, the program instructions may be further executable to delete at least one node in the first abstract syntax tree. In some implementations, the program instructions may be further executable to train a machine learning model to generate an alignment of nodes based on the first abstract syntax tree and the second abstract syntax tree. In some implementations, the training the machine learning model may include: generating a predicted node alignment between the first abstract syntax tree and the second abstract syntax tree; comparing the predicted node alignment and a ground truth node alignment; and training the machine learning model based on the comparing.

In other implementations, a system may include: a processor, a computer-readable memory, one or more computer-readable storage media, and program instructions collectively stored on the one or more computer-readable storage media. The program instructions may be executable to: obtain a first abstract syntax tree that represents a source code snippet; generate a second abstract syntax tree from the first abstract syntax tree; for each node in a first set of nodes in the second abstract syntax tree, change a field value of the node; delete each node in a second set of nodes in the second abstract syntax tree; and for each node in a third set of nodes in the second abstract syntax tree, change a parent node of the node.

In some implementations, the program instructions may be further executable to delete at least one node in the first abstract syntax tree. In some implementations, the program instructions may be further executable to train a machine learning model to generate an alignment of nodes based on the first abstract syntax tree and the second abstract syntax tree. In some implementations, the training the machine learning model may include: generating a predicted node alignment between the first abstract syntax tree and the second abstract syntax tree; comparing the predicted node alignment and a ground truth node alignment; and training the machine learning model based on the comparing.

Implementations may address problems with the limited accuracy of conventional heuristics for determining an alignment between matching/corresponding nodes of predecessor and successor graphs in order to generate a change graph. In particular, some implementations may improve the functioning of a computer by providing methods and systems for training a machine learning model and using the trained machine learning model to more accurately determine alignments between matching/corresponding nodes of predecessor and successor graphs representing predecessor and successor source code snippets. Accordingly, through the use of rules that improve computer-related technology, implementations allow computer performance of functions not previously performable by a computer. Additionally, implementations use techniques that are, by definition, rooted in computer technology (e.g., machine learning models, GNNs, GMNs, etc.).

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   obtaining a first abstract syntax tree that represents a source code snippet;
   generating, from the first abstract syntax tree, a second abstract syntax tree, and a ground truth node alignment between the first abstract syntax tree and the second abstract syntax tree;
   modifying the second abstract syntax tree by:
      for each node in a first set of nodes in the second abstract syntax tree, changing a field value of the node;
      deleting each node in a second set of nodes in the second abstract syntax tree; and
      for each node in a third set of nodes in the second abstract syntax tree, changing a parent node of the node; and
   training a machine learning model to generate an alignment of nodes based on the first abstract syntax tree and the second abstract syntax tree, comprising:
      generating, using the machine learning model, a predicted node alignment between the first abstract syntax tree and the second abstract syntax tree; and
      updating the machine learning model based on (i) the predicted node alignment between the first abstract syntax tree and the second abstract syntax tree and (ii) the ground truth node alignment between the first abstract syntax tree and the second abstract syntax tree.

2. The method according to claim 1, further comprising deleting at least one node in the first abstract syntax tree.

3. The method according to claim 1, wherein the machine learning model comprises a graph neural network.

4. The method according to claim 1, further comprising:
   obtaining a third abstract syntax tree that represents a predecessor source code snippet and a fourth abstract syntax tree that represents a successor source code snippet;
   determining a mapping across the third abstract syntax tree and the fourth abstract syntax tree between pairs of matching nodes;
   obtaining a first control-flow graph that represents the predecessor source code snippet and a second control-flow graph that represents the successor source code snippet;
   aligning blocks in the first control-flow graph with blocks in the second control-flow graph based on the mapping across the third abstract syntax tree and the fourth abstract syntax tree; and
   applying the aligned blocks as inputs across the machine learning model to generate an alignment of nodes in the third abstract syntax tree with nodes in the fourth abstract syntax tree.

5. The method according to claim 4, further comprising generating a change graph based on the alignment of the nodes in the third abstract syntax tree with the nodes in the fourth abstract syntax tree, wherein the change graph represents one or more edits made to the predecessor source code snippet to yield the successor source code snippet.

6. A computer program product comprising one or more non-transitory computer-readable storage media having program instructions collectively stored on the one or more non-transitory computer-readable storage media, the program instructions executable to:
   obtain a first abstract syntax tree that represents a source code snippet;
   generate, from the first abstract syntax tree, a second abstract syntax tree, and a ground truth node alignment between the first abstract syntax tree and the second abstract syntax tree;
   modify the second abstract syntax tree by:
      for each node in a first set of nodes in the second abstract syntax tree, changing a field value of the node;
      deleting each node in a second set of nodes in the second abstract syntax tree; and
      for each node in a third set of nodes in the second abstract syntax tree, changing a parent node of the node; and
   train a machine learning model to generate an alignment of nodes based on the first abstract syntax tree and the second abstract syntax tree, comprising:

generating, using the machine learning model, a predicted node alignment between the first abstract syntax tree and the second abstract syntax tree; and
updating the machine learning model based on (i) the predicted node alignment between the first abstract syntax tree and the second abstract syntax tree and (ii) the ground truth node alignment between the first abstract syntax tree and the second abstract syntax tree.

7. The computer program product according to claim 6, wherein the program instructions are further executable to delete at least one node in the first abstract syntax tree.

8. The computer program product according to claim 6, wherein the machine learning model comprises a graph neural network.

9. The computer program product according to claim 6, wherein the program instructions are further executable to:
obtain a third abstract syntax tree that represents a predecessor source code snippet and a fourth abstract syntax tree that represents a successor source code snippet;
determine a mapping across the third abstract syntax tree and the fourth abstract syntax tree between pairs of matching nodes;
obtain a first control-flow graph that represents the predecessor source code snippet and a second control-flow graph that represents the successor source code snippet;
align blocks in the first control-flow graph with blocks in the second control-flow graph based on the mapping across the third abstract syntax tree and the fourth abstract syntax tree; and
apply the aligned blocks as inputs across the machine learning model to generate an alignment of nodes in the third abstract syntax tree with nodes in the fourth abstract syntax tree.

10. The computer program product according to claim 9, wherein the program instructions are further executable to generate a change graph based on the alignment of the nodes in the third abstract syntax tree with the nodes in the fourth abstract syntax tree, wherein the change graph represents one or more edits made to the predecessor source code snippet to yield the successor source code snippet.

11. A system comprising:
a processor, a computer-readable memory, one or more computer-readable storage media, and program instructions collectively stored on the one or more computer-readable storage media, the program instructions executable to:
obtain a first abstract syntax tree that represents a source code snippet;
generate, from the first abstract syntax tree, a second abstract syntax tree, and a ground truth node alignment between the first abstract syntax tree and the second abstract syntax tree;
modify the second abstract syntax tree by:
for each node in a first set of nodes in the second abstract syntax tree, changing a field value of the node;
deleting each node in a second set of nodes in the second abstract syntax tree; and
for each node in a third set of nodes in the second abstract syntax tree, changing a parent node of the node; and
train a machine learning model to generate an alignment of nodes based on the first abstract syntax tree and the second abstract syntax tree, comprising:
generating, using the machine learning model, a predicted node alignment between the first abstract syntax tree and the second abstract syntax tree; and
updating the machine learning model based on (i) the predicted node alignment between the first abstract syntax tree and the second abstract syntax tree and (ii) the ground truth node alignment between the first abstract syntax tree and the second abstract syntax tree.

12. The system according to claim 11, wherein the program instructions are further executable to delete at least one node in the first abstract syntax tree.

13. The system according to claim 11, wherein the machine learning model comprises a graph neural network.

14. The system according to claim 11, wherein the program instructions are further executable to:
obtain a third abstract syntax tree that represents a predecessor source code snippet and a fourth abstract syntax tree that represents a successor source code snippet;
determine a mapping across the third abstract syntax tree and the fourth abstract syntax tree between pairs of matching nodes;
obtain a first control-flow graph that represents the predecessor source code snippet and a second control-flow graph that represents the successor source code snippet;
align blocks in the first control-flow graph with blocks in the second control-flow graph based on the mapping across the third abstract syntax tree and the fourth abstract syntax tree; and
apply the aligned blocks as inputs across the machine learning model to generate an alignment of nodes in the third abstract syntax tree with nodes in the fourth abstract syntax tree.

15. The system according to claim 14, wherein the program instructions are further executable to generate a change graph based on the alignment of the nodes in the third abstract syntax tree with the nodes in the fourth abstract syntax tree, wherein the change graph represents one or more edits made to the predecessor source code snippet to yield the successor source code snippet.

* * * * *